Inventor.
Alvin F. Hendricks.
By Bair, Freeman & Molinare
Attys.

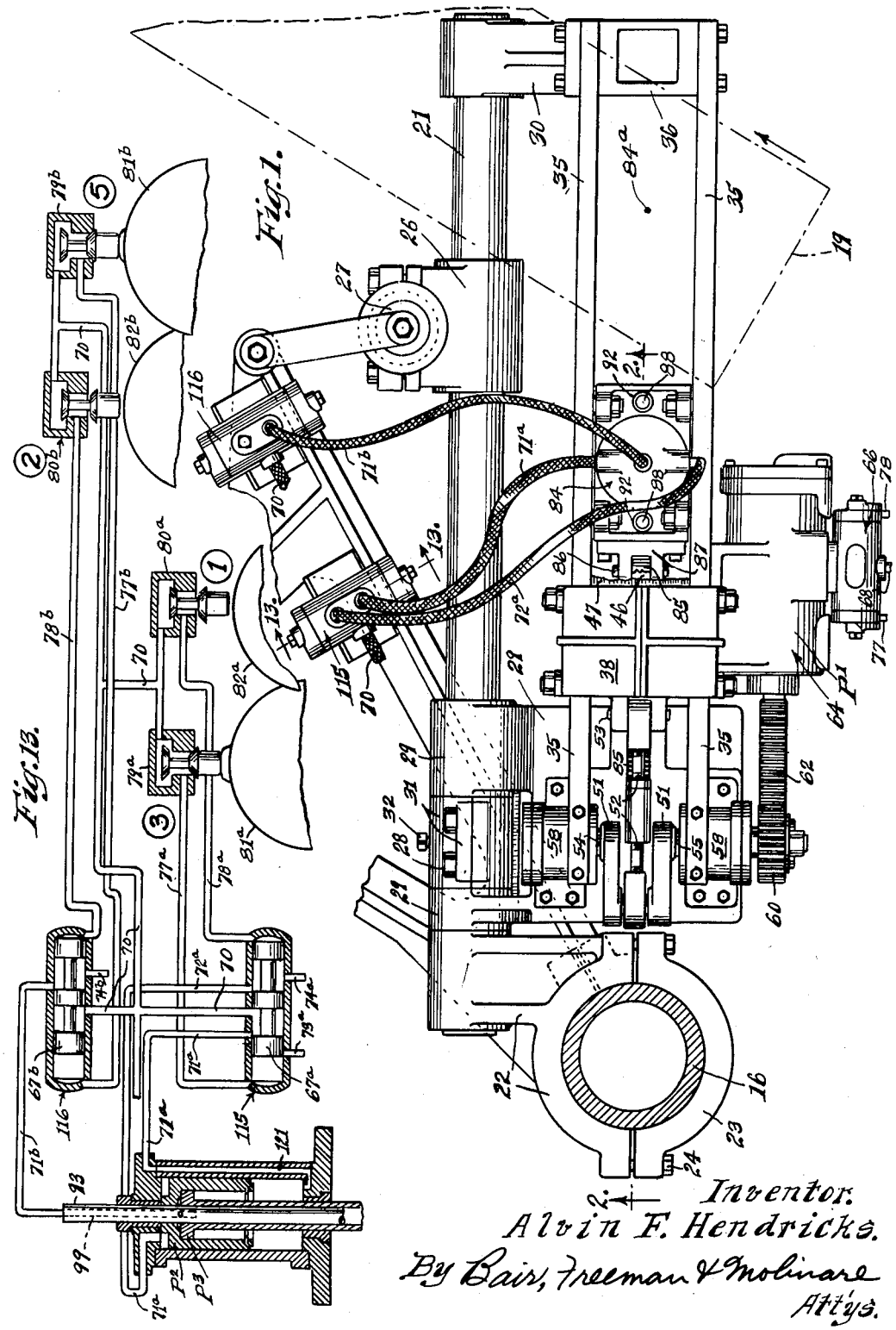

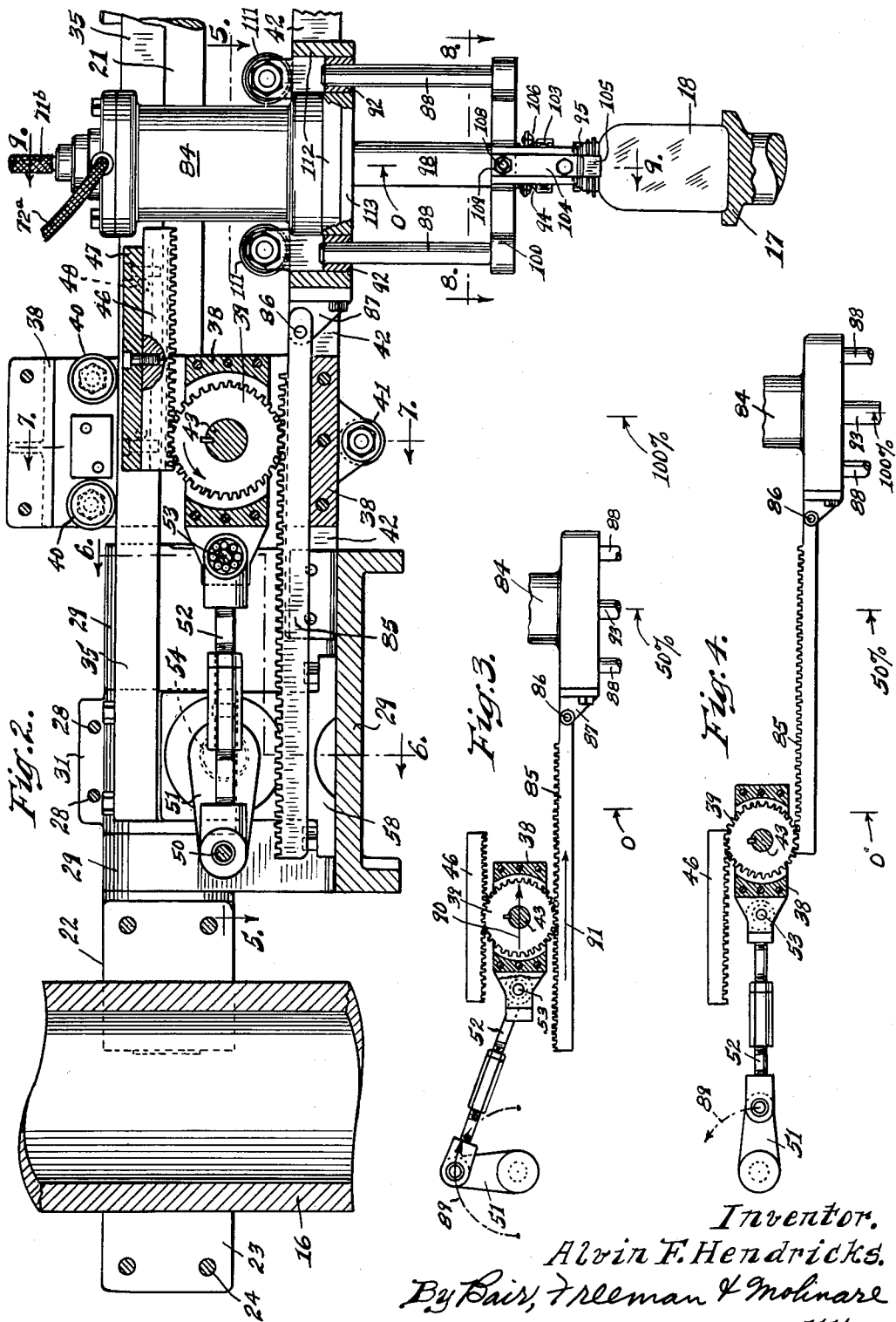

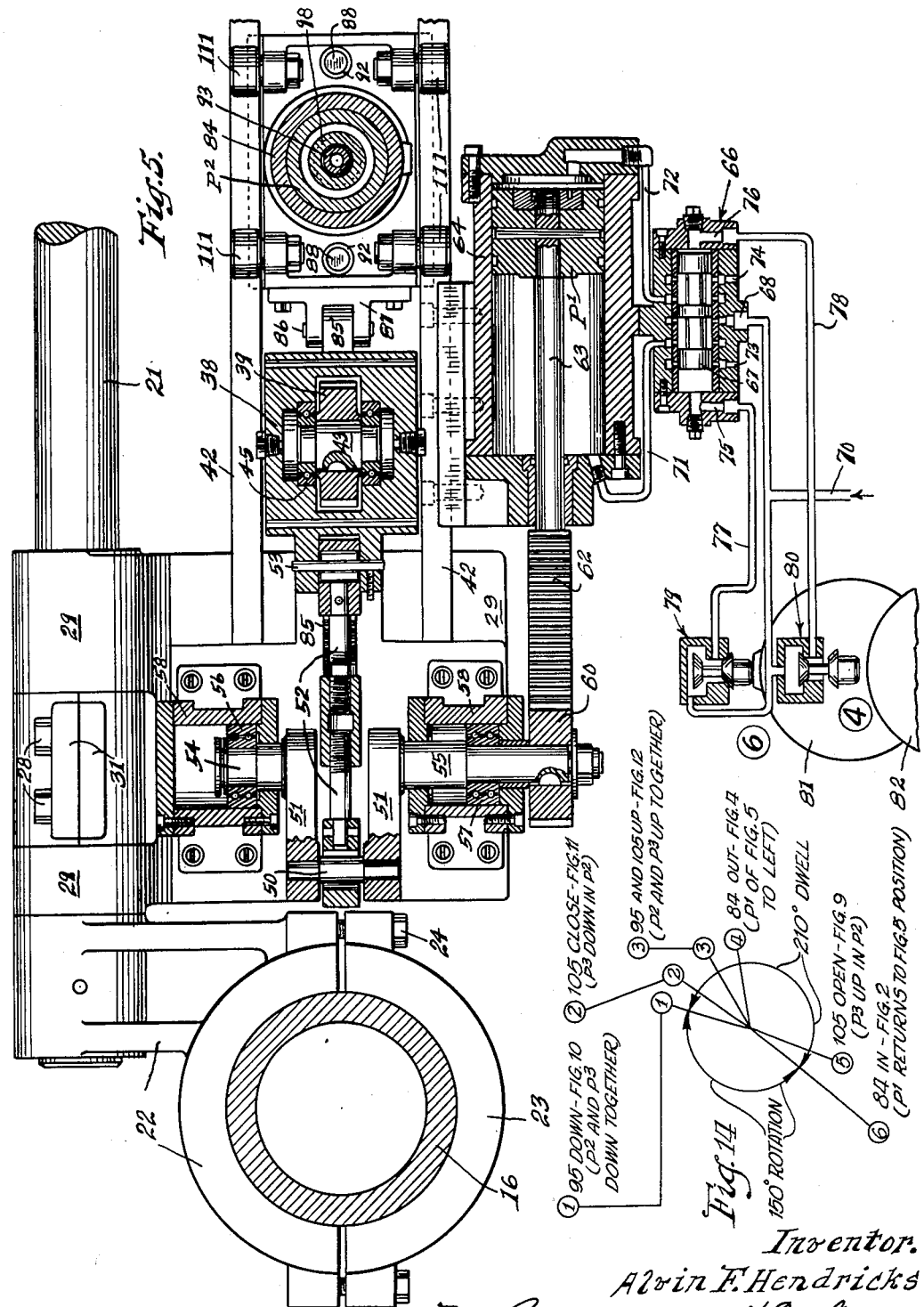

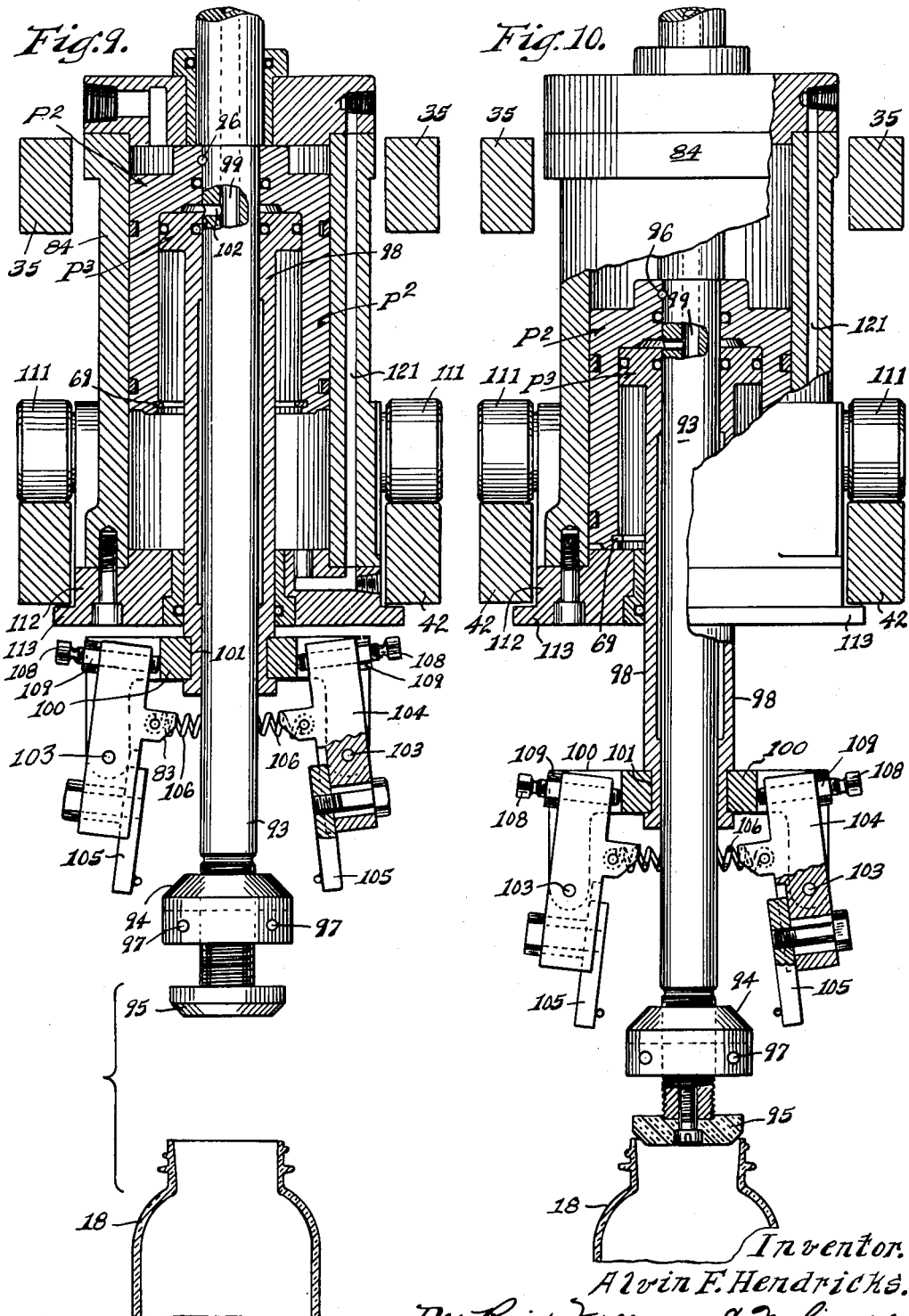

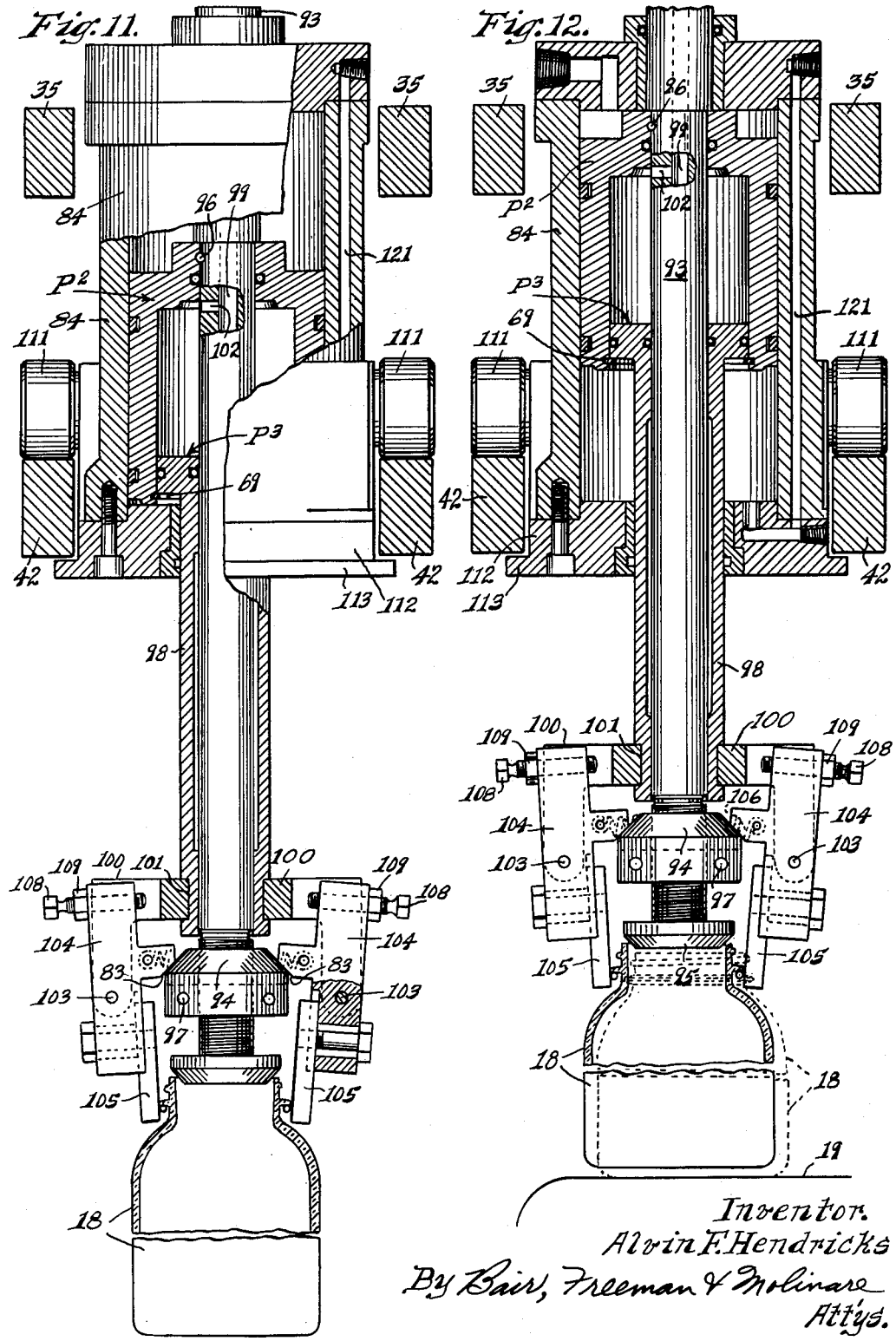

United States Patent Office 2,725,154
Patented Nov. 29, 1955

2,725,154

TAKE-OUT FOR GLASSWARE

Alvin F. Hendricks, Anderson, Ind., assignor to Lynch Corporation, Anderson, Ind., a corporation of Indiana Application August 30, 1952, Serial No. 307,290

8 Claims. (Cl. 214—658)

This invention relates to a reciprocating take-out mechanism for glassware formed in a glassware forming machine of the type shown in Miller Patent No. 2,097,130, and Langer Patent No. 2,268,075, and contemplates a pneumatically operated take-out mechanism capable of substitution for those disclosed in the patents referred to.

One object of the present invention is to provide a harmonic motion for the reciprocating take-out mechanism for starting and stopping it gradually and thus eliminating jerking the ware at either end of the take-out stroke as when a reciprocating piston is used to directly drive the mechanism. I employ a crank motion that oscillates through 180° which is interposed between the reciprocating piston and the take-out mechanism to accomplish the harmonic motion.

Another object is to provide an increase in the motion of the take-out mechanism with respect to the motion of the piston accomplished by utilizing the crank to reciprocate a gear carrier provided with a gear meshing with (1) a stationary rack and (2) a rack connected to the take-out mechanism, thus speeding up the motion of the take-out mechanism two-to-one with respect to the motion of the operating piston.

Still another object is to provide control mechanism for the piston operated by the timer of the glassware forming machine at the appropriate positions in the cycle of operation thereof for moving the take-out mechanism from take-out position to a take-away position and back again.

A further object is to provide a ware lifting mechanism for the take-out which first centers the ware by means of a centering plug so as to prevent the ware from being undesirably shifted when the finish rings open and so that lifting jaws may properly cooperate with the ware.

Still a further object is to provide lifting jaws thereafter cooperable with the ware and with the centering plug to grasp the ware and elevate it without any swinging motion of the ware relative to the lifting jaws during subsequent movement of the take-out mechanism from take-out position to a position with the ware suspended over a take-away conveyor.

An additional object is to provide a dual piston means for operating the centering plug and the lifting jaws in proper sequence for both grasping and releasing the ware, one piston being movable within the other, which other one constitutes a cylinder for the first piston.

Another additional object is to provide control mechanism for the dual piston arrangement operated by the timer of the glassware forming machine at the appropriate positions in the cycle of operation thereof for moving the two pistons of the dual piston arrangement for causing the centering plug to coact with the ware, the jaws to grip the ware, the jaws and centering plug to lift the ware, and the jaws to open for permitting the ware to drop a small distance onto the take-away conveyor.

With these and other objects in view, my invention consists in the construction, arrangement and combination of the various parts of my take-out for glassware, whereby the objects contemplated are attained, as hereinafter more fully set forth, pointed out in my claims and illustrated in the accompanying drawings, wherein:

Figure 1 is a plan view of my take-out for glassware showing the parts in one position.

Figure 2 is an enlarged sectional view on the line 2—2 of Figure 1.

Figures 3 and 4 are diagrammatic views showing different positions of the parts during a cycle of operation.

Figure 5 is a horizontal sectional view on the line 5—5 of Figure 2 and includes a diagrammatic showing of the timer for operating one of the pneumatic pistons of the take-out.

Figure 6:
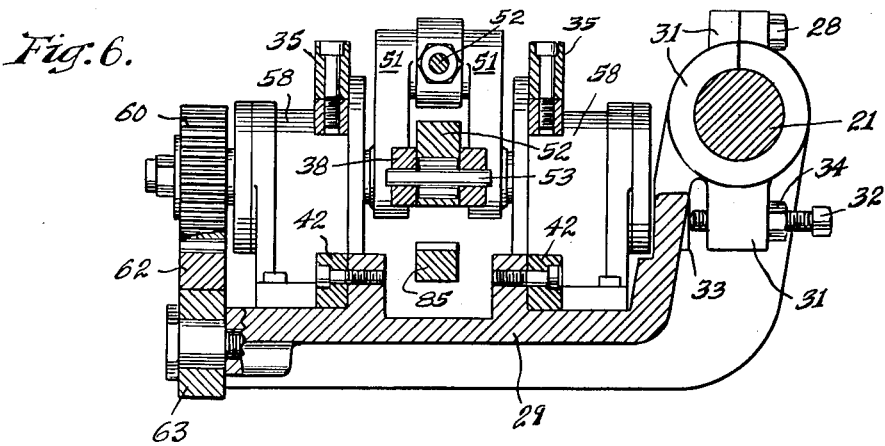
Figure 7:
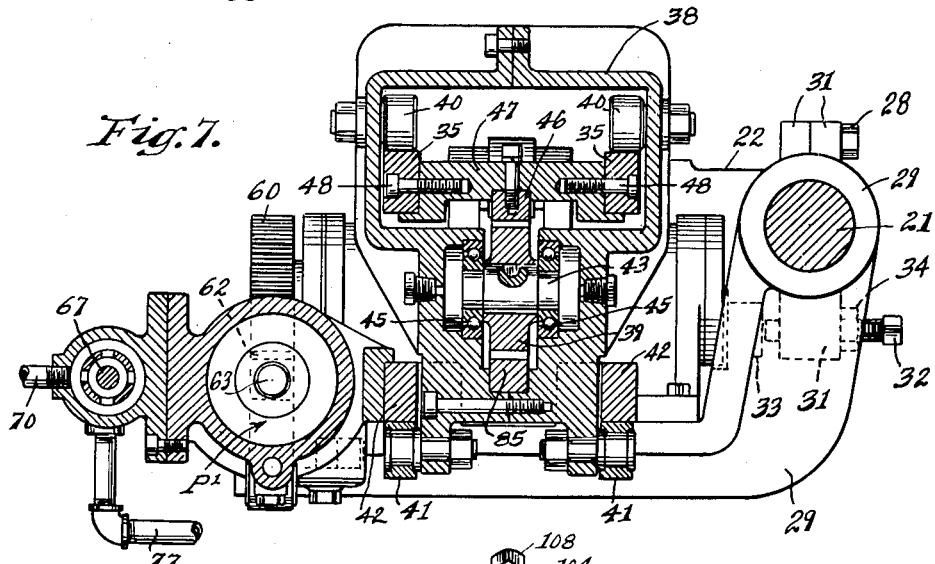

Figures 6 and 7 are vertical sectional views on the lines 6—6 and 7—7 respectively of Figure 2 to show details of construction and relation of parts.

Figure 8:
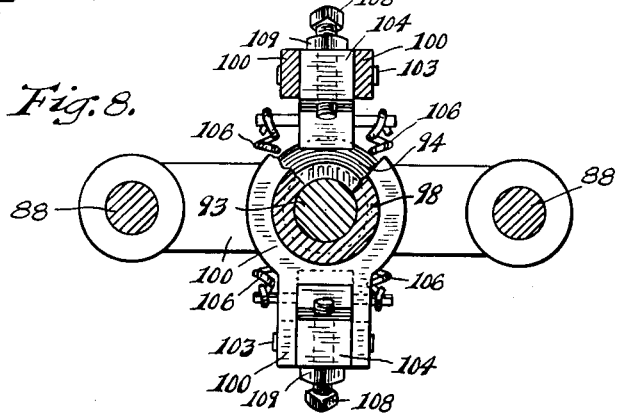

Figure 8 is an enlarged horizontal sectional view on the line 8—8 of Figure 2, showing a plan view of the jaws for engaging the glassware.

Figure 9 is an enlarged vertical sectional view on the line 9—9 of Figure 2 showing a glassware lifting mechanism with the parts in a different position than that illustrated in Figure 2 as assumed at the beginning of an operating cycle thereof.

Figures 10, 11 and 12 are similar sectional views showing progressive positions of the parts during the operating cycle with Figure 11 corresponding to Figure 2.

Figure 13 is a diagrammatic view of the glassware lifting mechanism in the position shown in Figure 9 and the control valves therefor; and Figure 14 is a chart showing the sequence of operations during the operating cycle of my take-out mechanism.

On the accompanying drawings I have used the reference numeral 16 to indicate the stationary column of a glass forming machine of the general type shown in Miller Patent No. 2,097,130. Machines of this character are provided with a rotary table indexed periodically by a suitable mechanism such as a Geneva drive and a plurality of stations around the rotary table are provided with molds for glassware including a bottom plate such as shown at 17 in Figure 2. Since the glassware machine forms no part of my present invention, I have not illustrated the details thereof. On the other hand, the present invention has to do with a take-out of the reciprocating type shown in the Miller patent just referred to and in Langer Patent No. 2,268,075, and contemplates a mechanism for substitution in place of the former take-outs for transferring the finished ware from the glass blowing machine to the take-away conveyor 19 (see Figures 1 and 12) that delivers it to an annealing lehr.

Supporting means are provided for the present take-out mechanism including a rod 21 which in turn is supported by a stationary bracket 22 at its left end in Figure 1. The bracket 22 has a clamp 23 associated therewith whereby the bracket and clamp surround the stationary column 16 and may be clamped thereto by clamp bolts 24.

Another stationary bracket 26 is provided for the rod 21 spaced somewhat from its outer right-hand end in Figure 1 and this bracket is supported by a post 27 extending upwardly from the base of the machine.

A forked swing bracket 29 is oscillatable on the rod 21 and a second swing bracket 30 is also oscillatable thereon. A stop hub 31 is clamped on the rod 21 between the arms of the forked bracket 29 by means of clamp screws 28. The stop hub 31 carries an adjustable stop screw 32 which may be locked by a lock nut 34. The bracket 29 has a stop pad 33 normally resting against the stop screw 32 and the bracket 29 may thus be adjusted to a level position, yet the mechanism carried thereby and by the bracket 30 can swing upwardly about the rod 21 (clockwise in Figures 6 and 7) as in the Miller patent hereinbefore referred to in the event of misoperation of parts and collision of some of the mechanism on the rotary table with the take-out mechanism.

Upper guide rails 35 and lower guide rails 42 are carried by the brackets 29 and 30, a spacer 36 being associated with the bracket 30 for properly spacing the outer ends of the rails. A gear carrier 38 (see Figure 7) in the form of a frame around the upper rails 35 and depending between the lower rails 42 is provided, a gear 39 being rotatable therein. Upper rollers 40 and lower rollers 41 contact the upper edges of the guide rails 35 and the lower edges of the guide rails 42 for guiding the gear carrier 38 with respect to the rails. The gear 39 is mounted on a stub shaft 43, the ends of which are rotatable in ball bearings 45.

Referring to Figures 2 and 7, a stationary rack 46 is carried by a cross bracket 47 which in turn is secured as by bolts 48 to the upper guide rails 35. It is obvious that when the gear carrier 38 moves toward the right in Figure 2, it will cause the gear 39 meshing with the stationary rack 46 to roll along the rack 46 and thereby rotate counter-clockwise.

For moving the gear carrier 38 in the manner just referred to, I provide a crank pin 50 carried by crank arms 51 and connected by a connecting rod 52 and a pin 53 with the gear carrier 38 as shown in Figure 5. The crank arms 51 are carried by a crank shaft 54—55 journaled in bearings 56 and 57. These bearings are contained in bearing housings 58 secured to the bracket 29. The section 55 of the crank shaft has secured thereto a pinion 60. A rack 62 is meshed therewith and is held in mesh by a roller 63 (see Figure 6). A piston rod 63 extends from the rack 62 into a horizontal cylinder 64 in which a piston $P^1$ is reciprocably mounted, the piston being secured to the piston rod 63.

A spool valve 66 is provided for controlling the introduction of compressed air to opposite ends of the cylinder 64 and also the bleeding of air therefrom. The spool valve has a spool 67 therein and is provided with an inlet 68 for compressed air from a main air line 70 as shown diagrammatically in Figure 5. Conduits 71 and 72 extend from the spool valve to the ends of the cylinder 64 for introducing an exhausting air with relation thereto and the spool valve is provided with exhaust ports 73 and 74. The spool valve is adapted to be actuated by compressed air introduced through ports 75 and 76 connected by conduits 77 and 78 to control valves 79 and 80. These are the usual timer valves of a pneumatically operated glass forming machine and may be actuated by cams 81 and 82 of the timer in the usual manner.

The mechanism thus far described and operable to move the gear carrier 38 is provided for the purpose of imparting reciprocating motion to a glassware lifting cylinder 84. This is accomplished by means of a second rack 85 meshing with the lower teeth of the gear 39 as shown in Figure 2 and pinned as at 86 to a boss 87 extending from the cylinder 84. When the gear carrier 38 is moved a certain distance toward the right in Figure 2, the rack 85 and consequently the lifting cylinder 84 will be moved twice that far as will be obvious from an inspection of Figure 3 wherein half the movement (50%) has been completed, arrows 89, 90 and 91 indicating the direction of movement with the length of the arrows indicating the relative degrees of movement. In Figure 4 the completion of the movement toward the right (100%) is illustrated. In addition to the legends 50% and 100% being part of Figures 3 and 4, zero percent (0%) is indicated in Figures 2, 3 and 4.

Referring to Figure 9, the construction of the glassware lifting cylinder 84 and its associated parts are illustrated. Within the cylinder are pistons $P^2$ and $P^3$, $P^2$ being cylindrical and constituting a cylinder for $P^3$. A piston rod 93 extends downwardly from the piston $P^2$, being pinned thereto at 96, and has a cam 94 adjacent its lower end. A passageway 99 and a port 102 are formed in the piston rod 93. At the lower end a glassware centering plug 95 of asbestos or the like is provided. The cam 94 is adjustable relative thereto, being threaded on the piston rod 93 and provided with clamp screws 97 to retain the adjustment.

The piston $P^3$ is provided with a tubular piston rod 98 surrounding the piston rod 93 and extending out of the lower end of the cylinder 84. A snap ring 69 is located in the piston $P^2$ adjacent the lower end thereof to act as a stop for the piston $P^3$ in its lowermost position relative to $P^2$ shown in Figures 10, 11 and 12. Bracket 100 is mounted thereon and located in a groove 101 of the piston rod 98. This bracket is guided by a pair of guide rods 88 (see Figures 2 and 8) secured thereto and extending slidably through bushings 92 in the lower head 112 of the cylinder 84. The bracket 100 carries a pair of pivot pins 103 on which glassware engaging jaws 104 are pivoted. These jaws have interchangeable and adjustable jaw elements 105 which are normally held in spread position by a pair of springs 106. Their spread positions may be adjusted by adjusting screws 108 provided with lock nuts 109 to retain the adjustment, the screws being normally in contact with the bracket 100 as in Figure 9 under the bias of the springs 106.

The cylinder 84 is supported by rollers 111 which travel on top of the lower guide rails 42. The lower head 112 of the cylinder 84 is provided with extensions 113 under the guide rails 42 as shown in Figure 9 to prevent undesirable upward movement of the cylinder.

Spool valves 115 and 116 are provided for operating the pistons $P^2$ and $P^3$. These have main air connections 70 and exhaust ports $73a$, $73b$, $74a$ and $74b$ the same as the spool valve 66 shown in Figure 5. The spool valves 115 and 116 are shown diagrammatically in Figure 13. Conduits $71a$ and $72a$ extend from the spool valve 115 to the upper and lower ends respectively of the cylinder 84 and a conduit $71b$ extends from the spool valve 116 to the upper end of the piston rod 93. The conduit 119 is connected with a passageway 121 lengthwise of the cylinder 84 for conducting the air down to the lower end thereof.

For operating the spool valve 115, I provide timer valves and cams as already described in connection with the spool valve 66 and part Nos. $77a$, $78a$, $79a$, $80a$, $81a$ and $82a$ have been applied thereto. Similarly for operating the spool valve 116, I provide the parts $79b$, $80b$, $81b$ and $82b$ shown in Figure 13.

*Practical operation*

In the operation of my take-out mechanism, glassware is illustrated at 18. Assuming the glassware to have arrived at the take-out station as shown in Figure 2 and resting on the mold bottom plate 17 and the mold (not shown) being open at the time in the usual manner, but starting with the ware lifting mechanism in the position of Figures 9 and 13 instead of the position shown in Figure 2 which corresponds to that shown in Figure 11, the timer valve $80a$ opens for shifting the spool $67a$ toward the left from the position shown in Figure 13, thereby exhausting air from below the pistons $P^2$ and $P^3$ through the passageway 121, the conduit $71a$ and the exhaust port $73a$. At the same time compressed air is introduced through the conduit $72a$ to the cylinder 84 above the piston $P^2$ therein. This drives the piston $P^2$ downwardly from the position of Figure 9 to the position of Figure 10 carrying with it the piston $P^3$ and the jaws 104 which remain open as shown in Figure 10. The centering plug 95 enters the ware 18 to keep it from pulling to one side or the other as the finish rings of the mold open for releasing the ware. This operation is designated (1) on the timing chart of Figure 14 and adjacent the valve $80a$ in Figure 13.

Next the spool $67b$ of the valve 116 is shifted toward the left from the position shown in Figure 13 by opening of the valve 80b so that air is introduced from the main air line 70 to the conduit 78b and then 71b to the passageway 99 in the piston rod 93. The air thus introduced through 99 and the port 102 within the piston P² acts on the piston P³ to force it downwardly to the position shown in Figure 11 for closing the jaws 104—105 by movement of the tubular piston rod 98 and thereby the jaws with it until the cam surfaces 83 of the jaws engage the cam 94 and close the jaws 105 against the action of the springs 106 with the centering plug 95 within the finish of the ware 18 yet not quite touching it. This operation is designated (2) in Figure 14 and adjacent the valve 80b in Figure 13.

The next operation is lifting of the ware 18 as to the position of Figure 12 accomplished by bleeding air from the cylinder 84 above the piston P² and introducing air therebelow as a result of returning the spool 67a of the spool valve 115 to the initial position shown in Figure 13. The cam 81a opens the control valve 79a for this purpose, this position being the one shown and the operation being designated (3) in Figure 14.

After the lifting cylinder has lifted the ware 18 far enough to clear the bottom plate 17 in Figure 2, the lifting cylinder 84 may be moved to its outermost position as shown in Figure 4 which is accomplished by the cam 82 opening the valve 80 for introducing compressed air through the conduit 78 to the right-hand end of the spool valve 66 shown in Figure 5. This exhausts air from the left-hand end of the piston P¹ through the conduit 71 and the exhaust port 73 and introduces air from 70 through 68 and 72 to the right-hand end of the piston.

Accordingly, the piston travels to the left and carries with it the rack 62 from the retracted position of Figure 5 to an extended position. In doing this, the rack rotates the pinion 60 clockwise and likewise the crank shaft 54—55 clockwise for swinging the crank pin 50 through a 180° arc as shown by dash lines in Figure 3 and in the direction of the arrow 89. The final position of the crank pin is shown in Figure 4 with the lifting cylinder 84 at its extreme outer limit of movement along the guide rails 42, which position would be adjacent the spacer 36 in Figure 1, the axis of the cylinder at that time being indicated in this figure by a dot 84a. In this position, the ware is in the proper position over the take-away conveyor 19 which is shown by dot-and-dash lines in Figure 1 and which is diagrammatically indicated in Figure 12. This operation is designated (4) in Figures 5 and 14.

The jaws 105 are still closed in Figure 12 and the next step in the operation is to open them so that they release the ware and permit it to drop to the dotted position, the drop being a slight distance (only enough to permit the ware to clear the conveyor 19 as it is moved to position over the conveyor). The release of the jaws is effected by upward movement of the piston P³ within the piston P² as a result of bleeding the air from within the piston P² above the piston P³. This is accomplished by the control valve 79b being opened by the cam 81b to shift the spool 67b of the valve 116 to the original position shown in Figure 13, this being the position of the cam 81b shown in this figure. Air pressure is still under the pistons P² and P³ from the valve 115 in the position shown in Figure 13 and acts to move the piston P³ away from the snap ring 69 and to its upper limit of movement which would be the same position shown in Figure 9. The lifting cylinder and its parts are thus returned to the beginning of the cyle as illustrated in Figure 9 and the operation just described is designated (5) on Figures 13 and 14.

As soon as the jaws 105 release the ware 18, the cylinder 84 may be returned inwardly to its initial position shown in Figure 1 accomplished by reversing the position of the spool valve 67 to the position shown in Figure 5 by opening of the control valve 79 by the cam 81 as also shown whereupon the parts are in position for the beginning of the next cycle of removing the next piece of ware from the glassware forming machine. The operation set forth in this paragraph is designated (6) in Figures 5 and 14.

With further reference to Figure 14, 360° of rotation of the Geneva movement for the table of the glassware forming machine is indicated. A relatively long circumferential arrow indicates a "210° rotation" of the Geneva rotator during dwell of the table and a somewhat shorter circumferential arrow indicates "150° rotation" of the Geneva rotator during which rotation of the table is had. In other words, the table dwells during $210/360$ of a cycle and is moving station-to-station through $150/360$ thereof.

My take-out mechanism herein disclosed operates beginning at the "start of dwell of table" and stops operating at the completion of the dwell or "start of rotation of table" so that it is dormant in position adjacent the take-out station just before dwell of the table commences. The various operations designated (1) to (6) hereinbefore are illustrated at the respective positions around the circle where these operations commence to take place, and the significant parts involved in each operation are designated in legend form on Figure 14 to give a clearer understanding of just when in the cycle each of the operations enumerated starts.

It will be noted that operations (1), (2), (3) and (4) occur relatively close together and there is considerable space between (4) and (5) so that appropriate valves (not shown) but usually provided in connection with spool valves of the type shown in Figure 5 may cause a relatively slow travel of the lifting cylinder outwardly while supporting the ware, and after the ware is dropped at (5), the cylinder 84 may be started to return at (6) and the return may be quicker than the movement outward in operation (4) so that the lifting cylinder is back in position for taking away the next piece of ware by the time the intermittent rotation of the glassware forming table has been completed and the dwell starts again.

From the foregoing description, it will be obvious that I have provided a take-out mechanism which accomplishes the objects contemplated and in which the reciprocating motion of the lifting cylinder 84 is slowed down at the ends of its stroke by the crank motion imparted to it as distinguished from the usual reciprocating motion of a directly connected piston which requires elaborate pneumatic mechanisms and pneumatic circuits for accomplishing cushioning effectively. By interposing the crank motion between the reciprocating piston and the lifting cylinder 84, I secure a harmonic motion of the cylinder during its reciprocations between take-out and take-away positions which progressively slows down its movement at the ends of the strokes and has its fastest motion intermediate the ends.

I have also provided a centering plug and grasping jaw arrangement which effectively and efficiently engages the ware and prevents undesirable swinging thereof relative to the jaws that hold the ware when the ware is being moved by the reciprocating piston from the take-out station of the glassware forming machine to the take-away conveyor 19 which delivers the ware to the annealing lehr. The dual piston arrangement within the lifting cylinder 84 and the sequence of operations thereof as described produce the desired results in an efficient manner that permits relatively quick operation throughout the entire cycle and the mechanism is fully capable of handling relatively large ware such as gallon jugs and the like.

In the present specification I have described both the mechanism for moving the take-out from take-out position to take-away position, and the mechanism for grasping, lifting and releasing the ware. The appended claims have to do only with the second mentioned mechanism, the first mentioned mechanism being shown, described and claimed in my copending application, Serial No. 299,628, filed July 18, 1952.

Some changes may be made in the construction and arrangement of the parts of my take-out for glassware without departing from the real spirit and purpose of my invention, and it is my invention to cover by my claims any modified forms of structure or use of mechanical equivalents which may be reasonably included within their scope.

I claim as my invention:

1. In a take-out mechanism for glassware forming machines, ware gripping mechanism comprising a vertical cylinder, a cylindrical piston reciprocable therein, a piston rod extending downwardly from said cylindrical piston, a second piston reciprocable in said cylindrical piston, a tubular piston rod extending downwardly from said second piston and surrounding said first piston rod, ware-engaging jaws pivotally carried by said tubular piston rod, and a cam carried by said first piston rod, said jaws having cam surfaces engageable therewith upon reciprocation of said second piston relative to said first piston to effect pivotal movement of said jaws to ware-gripping position.

2. In a take-out mechanism of the character described, ware gripping mechanism comprising a vertical cylinder, a cylindrical piston reciprocable therein, a piston rod extending downwardly from said cylindrical piston and out of said cylinder, a ware centering plug on the lower end thereof, a second piston reciprocable within said tubular piston, said tubular piston constituting a cylinder for said second piston, a tubular piston rod surrounding said piston rod and connected at its upper end with said second piston, ware engaging jaws pivoted to the lower end of said tubular piston rod and having cam surfaces, spring means normally spreading said jaws, and a cam carried by said piston rod adjacent said centering plug and engageable by said cam surfaces as said second piston moves downwardly relative to said cylindrical piston to close said jaws to ware gripping position in opposition to said spring means.

3. In a take-out mechanism for glassware forming machines, a vertical cylinder, a cylindrical piston reciprocable therein, a piston rod extending downwardly from said cylindrical piston and out of said cylinder, means on the lower end thereof to enter the ware and hold it against side movement as the molds therefor open, a second piston reciprocable within said cylinder piston, said cylindrical piston constituting a cylinder for said second piston, a tubular piston rod surrounding said piston rod and connected at its upper end with said second piston, a bracket on the lower end thereof, ware engaging jaws pivoted to said bracket and having cam surfaces, and a cam carried by said piston rod adjacent said centering plug and engageable by said cam surfaces to close said jaws to ware gripping position.

4. In a take-out mechanism for glassware forming machines, ware gripping mechanism comprising a vertical cylinder, a cylindrical piston reciprocable therein, a piston rod extending downwardly from said cylindrical piston, a centering plug carried by the lower end of said piston rod and adapted to enter the ware, a second piston reciprocable in said cylindrical piston, ware-engaging jaws pivotally carried thereby, a cam carried by said piston rod, said jaws having cam surfaces engageable therewith upon reciprocation of said second piston to effect closure of said jaws to ware-gripping position, and means for successively introducing compressed air to said cylinder above said cylindrical piston, to the interior of said tubular piston above said second piston and to said cylinder below both pistons, and for bleeding air from said cylinder above said cylindrical piston to permit the air in said cylinder below both pistons to effect upward movement of the both pistons and then from the interior of said cylindrical piston to permit the air in said cylinder below both pistons to effect upward movement of the second piston relative to said cylindrical piston.

5. In a take-out mechanism, ware gripping mechanism comprising a vertical cylinder, a cylindrical piston reciprocable therein, a piston rod extending downwardly from said cylindrical piston, a centering plug carried by the lower end of said piston rod and adapted to enter the ware to center the same, a second piston reciprocable in said cylindrical piston, ware-engaging jaws pivotally carried thereby, a cam carried by said piston rod, said jaws having cam surfaces engageable therewith upon reciprocation of said second piston to effect closure of said jaws to ware-gripping position, and means for successively introducing compressed air to said cylinder above said cylindrical piston for lowering said centering plug and jaws to the interior of said cylindrical piston above said second piston for closing said jaws and to said cylinder below both pistons, and for bleeding air from said cylinder above said cylindrical piston therein to permit the air in said cylinder below said cylindrical piston to effect upward movement thereof for raising the jaws and then from said cylindrical piston to permit the air in said cylinder below said second piston to move it relative to said cylindrical piston for opening said jaws.

6. In a take-out mechanism of the kind disclosed, a vertical cylinder, a cylindrical piston reciprocable therein, a piston rod extending downwardly from said piston, a cam carried by the lower end of said piston rod, a second piston reciprocable in said cylinder, ware-engaging jaws pivotally carried thereby, said jaws having cam surfaces engageable with said cam upon reciprocation of said second piston to effect closure of said jaws to ware-gripping position, and means for successively introducing compressed air to said cylinder above said cylindrical piston, to the interior of said cylindrical piston above said second piston and to said cylinder below both pistons, and for successively bleeding air from said cylinder and said cylindrical piston above said second piston to permit the air in said cylinder below said pistons to effect successive upward movement thereof.

7. In a take-out mechanism for glassware forming machines, ware gripping mechanism comprising a vertical cylinder, a cylindrical piston reciprocable therein, a piston rod extending downwardly from said cylindrical piston and out of said cylinder, a ware centering plug on the lower end thereof, a second piston reciprocable within said cylindrical piston, said cylindrical piston constituting a cylinder for said second piston, a tubular piston rod surrounding said piston rod and connected at its upper end with said second piston, ware engaging jaws pivoted to the lower end of said tubular piston rod and having cam surfaces, spring means normally spreading said jaws, a cam carried by said piston rod adjacent said centering plug and engageable by said cam surfaces to close said jaws to ware gripping position, and means for successively introducing compressed air to said cylinder above said cylindrical piston, to the interior of said cylindrical piston above said second piston and to said cylinder below both pistons, and for bleeding air from said cylinder and then from said cylindrical piston above said second piston to permit the air in said cylinder below said pistons to effect upward movement of first said pistons together and then said second piston relative to said cylindrical piston.

8. In a take-out mechanism for glassware forming machines, ware gripping mechanism comprising a vertical cylinder, a cylindrical piston reciprocable therein, a piston rod extending downwardly from said cylindrical piston and out of said cylinder, a ware centering plug on the lower end thereof, a second piston reciprocable within said cylindrical piston, said cylindrical piston constituting a cylinder for said second piston, a tubular piston rod surrounding said piston rod and connected at its upper end with said second piston, ware engaging jaws pivoted to the lower end of said tubular piston rod and having cam surfaces, spring means normally spreading said jaws, a cam carried by said piston rod adjacent said centering plug and engageable by said cam surfaces to close said jaws to ware gripping position, and means for successively introducing compressed air to said cylinder above said cylindrical piston for lowering said centering plug and jaws, to the interior of said cylindrical piston above said second piston for closing said jaws, and to said cylinder below both pistons for raising first said cylindrical piston and said second piston with it for elevating the ware and then raising said second piston relative to said cylindrical piston for opening said jaws and thereby releasing the ware.

References Cited in the file of this patent

UNITED STATES PATENTS

| | | |
|---|---|---|
| 344,222 | Thomas | June 22, 1886 |
| 1,523,063 | Fuchs | Jan. 13, 1925 |
| 1,733,987 | Ingle | Oct. 29, 1929 |
| 1,843,285 | Ingle | Feb. 2, 1932 |
| 1,850,968 | Morton et al. | Mar. 22, 1932 |
| 2,119,725 | Stecher | June 7, 1938 |